United States Patent

[11] 3,628,578

[72] Inventor Kenneth D. Berg
 10822 Emander Road, Everett, Wash. 98201
[21] Appl. No. 853,386
[22] Filed Aug. 27, 1969
[45] Patented Dec. 21, 1971

[54] MOBILE RADIAL ARM SAW AND SAW TABLE
 13 Claims, 6 Drawing Figs.
[52] U.S. Cl. ........................................................ 143/6 A, 143/132 B
[51] Int. Cl. ....................................................... B27b 5/20
[50] Field of Search ............................................ 143/6 (1), 6 (47), 6, 43, 47, 47 C, 132, 132 B

[56] References Cited
 UNITED STATES PATENTS
1,593,079 7/1926 Jaeger .......................... 143/43
1,762,798 6/1930 Schaper et al. ................ 143/43
1,767,012 6/1930 Pfau .............................. 143/132 B
3,008,500 11/1961 Siemantel ...................... 143/132 B Primary Examiner—Donald R. Schran
Attorney—Graybeal, Cole & Barnard ABSTRACT: Truck mounted radial arm saw and detachable saw table extensions. The saw is mounted on the bed of a truck and with appropriate guide and mounting means is slidable from a position on the bed of the truck to a position which locates it entirely or partially on the tailgate. The saw is locked into position and saw table extensions can be quickly attached to the rear of the truck to extend outwardly to each side of the saw table. The extensions are easily mounted and dismounted. The table extensions connect to the truck and to the saw table proper.

3,628,578

KENNETH D. BERG
INVENTOR

BY Graybeal, Cole & Barnard
ATTORNEYS

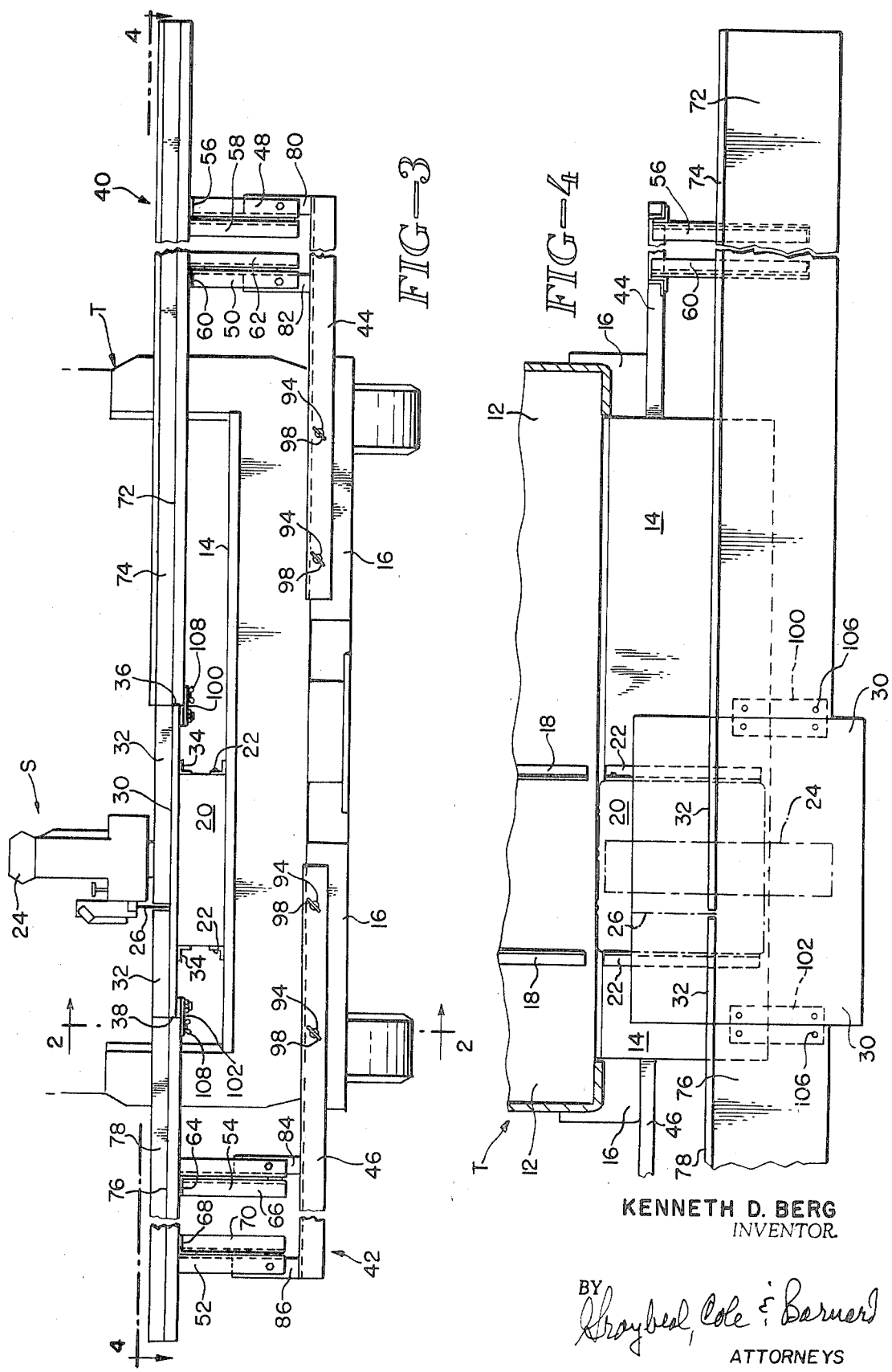

KENNETH D. BERG
INVENTOR.

BY Graybeal, Cole & Barnard
ATTORNEYS 3,628,578

MOBILE RADIAL ARM SAW AND SAW TABLE

BACKGROUND OF INVENTION

The invention relates generally to the art of radial arm table saw structures, and more particularly to a mobile saw and saw table structure which can be rapidly mounted and dismounted for quick relocation.

As those skilled in the art will realize, there is in the building industry a constant need for an onsite saw which will cut accurately and cleanly. In most instances this means a radial arm type saw. The currently used saws for most sites are too large and heavy for ready moving. It is quite common in fact to move a large, heavy radial arm saw to a jobsite and there built a temporary shelter for the saw for the time it is to be used. In such a case, lumber to be cut must be moved to the saw, which at times can be a considerable distance. Worker efficiency and productivity therefore are impaired if lumber must be moved any distance. The need therefore is for a saw which can be moved easily and quickly. Power handsaws and plain old fashion carpenter saws cannot be used because of the tendency to make inaccurate cuts. Setting up of a large stationary saw also requires time, and particularly in house construction where use of a large saw is inefficient and wasteful of labor time because the saw will not be on site for a sufficient period of time to justify its moving. It is therefore less expensive to set up the large stationary saw in a shop or garage and haul the materials back and forth. Thus, there is definite need for a way to move an accurate saw and to move the saw table structure with the saw in a minimum of time and with a minimum of inconvenience.

SUMMARY OF INVENTION

The saw itself is mounted in a truck between appropriate guide rails. Extensions of the guide rails are provided on the tailgate. When it is desired to use the saw it can be slidably moved from inside the bed out onto the tailgate and locked into position. Table extensions are mounted on each side of the saw and function as extensions of the saw table. The table extensions are frame devices which secure to the truck, as for instance the rear bumper, and to the underside of the saw table. The detachable tables are rigid and accurately positioned extensions of the saw table. Height of the extension table surfaces can be adjusted and quick mounting attachments are employed for securing the extensions to truck and saw.

Accordingly, it is among the many features of this invention to provide a portable saw and saw tables which can be moved and relocated on a particular jobsite in a fully assembled and mounted state. The time element within which the saw table can be assembled is a matter of several minutes and disassembly requires even less time. The invention permits the saw to be moved to the lumber and where terrain permits, the mobile saw structure can be moved around the house as for instance when siding is being installed. The invention permits shelving materials to be ripped accurately and it can also cut doors and plywood sheets with great accuracy. The invention amounts to a shop on wheels because the saw head can be pivoted 90° for ripping. It becomes entirely feasible because of this invention to set up for perhaps as few as a half dozen boards because of the rapidity with which the saw and tables can be prepared for use. Of great importance is the fact that the vehicle itself does not have to be level in order for the saw to cut accurately. The back rail of the saw table and saw table extensions can be provided with other conveniences such as a ruler so a tape does not have to be employed.

BRIEF DESCRIPTION OF DRAWINGS

FIG. 3 is a rear elevational view, parts of which have been cut away, to further illustrate details of construction and to show more clearly the relationship of various parts to each other.

FIG. 4 is a partial top plan view taken along the line 4—4 of FIG. 3 and further clarifying details of construction and mounting;

DESCRIPTION OF PREFERRED EMBODIMENT

Figure 1:
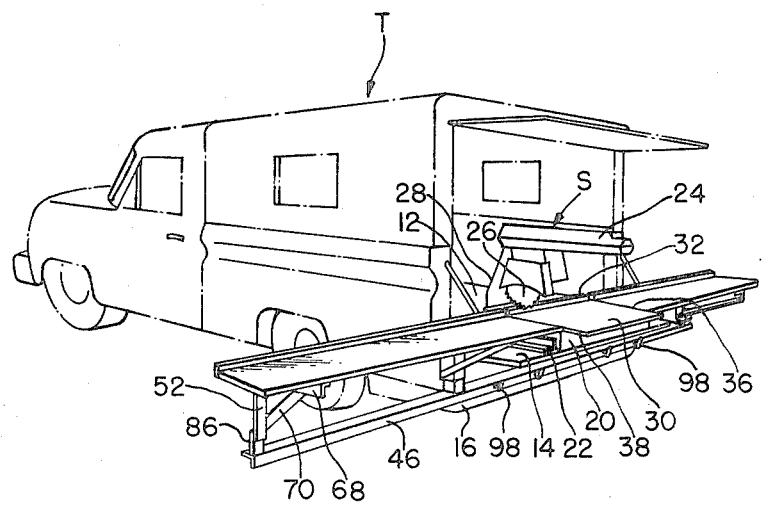
FIG. 1 is a view in perspective showing a pickup truck with the saw and saw table extensions in the fully assembled condition.

Referring now to the drawings, it will be seen that a vehicle such as a pickup truck T has a bed 12 and tailgate 14. The truck also has a rear bumper 16. Mounted on bed 22 are a pair of spaced-apart guide members 18, in this case angle irons between which is the base 20 of saw S. Guide rail extensions 22 are located on the tailgate 14 to hold the saw firmly when it is in position on the tail gate. The saw has arm portion 24 and blade 26 supported by rear column area 28. The saw is also provided with table 30 and rail 32. The saw table can be seen to extend beyond the side edges of base 20 and to be secured in position by support angles 34 or other conventional means of securing the saw table to the base. In this way, table side edges 36 and 28 are located outwardly to each side of base 20. It will be appreciated that the saw will move on casters or rollers or some other means when it is moved into or out of operating position as shown in the drawings.

When the saw has been rolled into position as shown, and locked by means not shown, the table extensions may be installed. The table extensions, generally designated by the members 40 and 42, comprise in each instance a lower bumper-engaging member 44 and 46, which in this instance is an elongated piece of angle iron. The support angles 44 and 46 are disposed so that one leg of the angle is vertical and the other leg is horizontal. Vertically upwardly extending brace members 48 and 50 for table extensions 40 and upstanding brace members 52 and 54 for table extension 42 are connected to main frame members 44 and 46 in a manner to be described hereinafter. It can be seen that main frame member 44 has inner end 45 and outer end 47 and that main frame member 46 of table extension 42 has inner end 49 and outer end 51. Vertical brace member 48 is located generally at the outer end 47, main frame member 44 and upper brace member 50 is located generally intermediate of ends 45 and 57. In like manner, upstanding brace member 52 of extension table 42 is located at end 51 and upstanding brace member 54 is located intermediate of ends 49 and 51. A surface support member 56 is attached to upper brace member 48 and held securely by angle support ember 58. In like manner, surface support member 60 is disposed horizontally and connected to upstanding brace member 50 and is made rigid by angle brace 62. On table extension 42, a surface support member 64 is braced by angle brace 66 and face support member 68 is held securely by angle brace 70. Table extension 40 has surface 72 and guide rail 74 and extension table 42 has surface 76 and rail 78. The triangular brackets described are supported on main frame members 44 and 46 by upstanding columns 80 and 82 on extension 40 and upstanding columns 84 and 86 on extension table 42. The triangular brackets are detachably secured the upstanding columns by bolts 88 and wing nuts 90 or other conventional tightening means. Either the columns or the upstanding coacting brace members will be provided with a series of holes or an elongated slot to permit the height of the tables to the adjusted precisely and fixed at the length desired.

Figure 2:
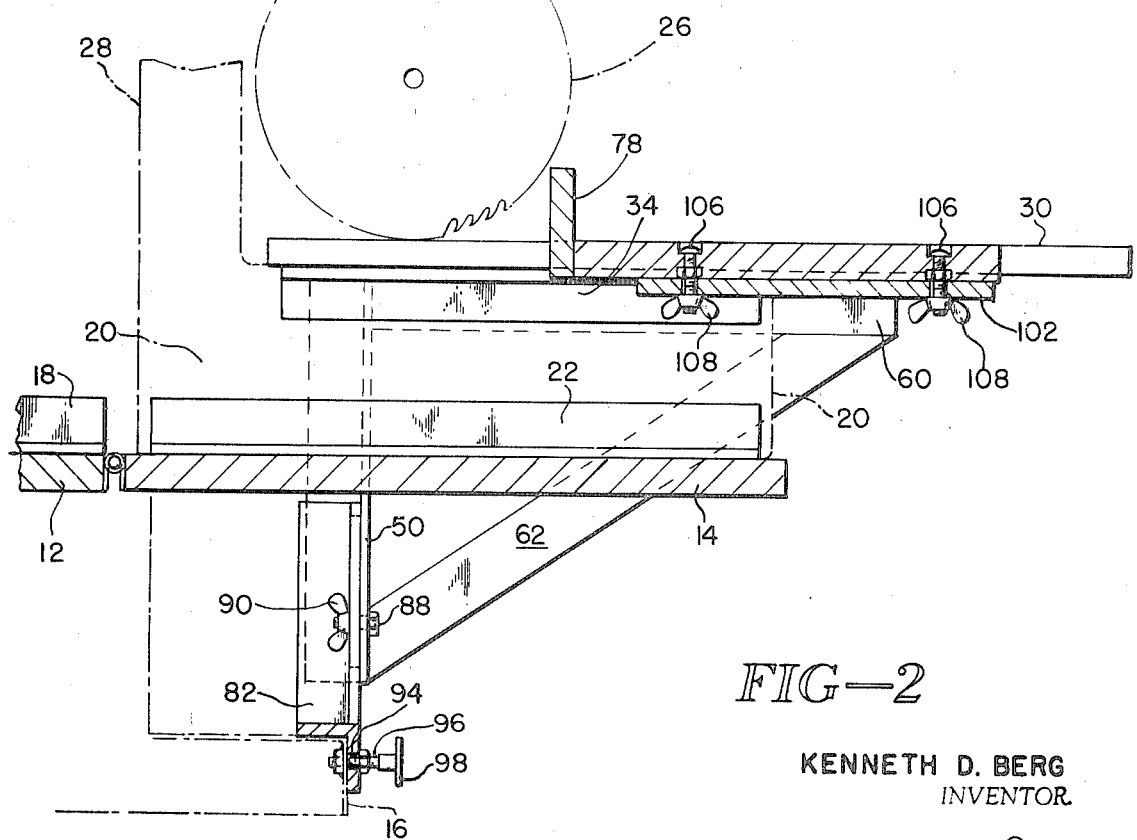
FIG. 2 is a partial cross section view in elevation showing details of construction and mounting.
Figure 5:
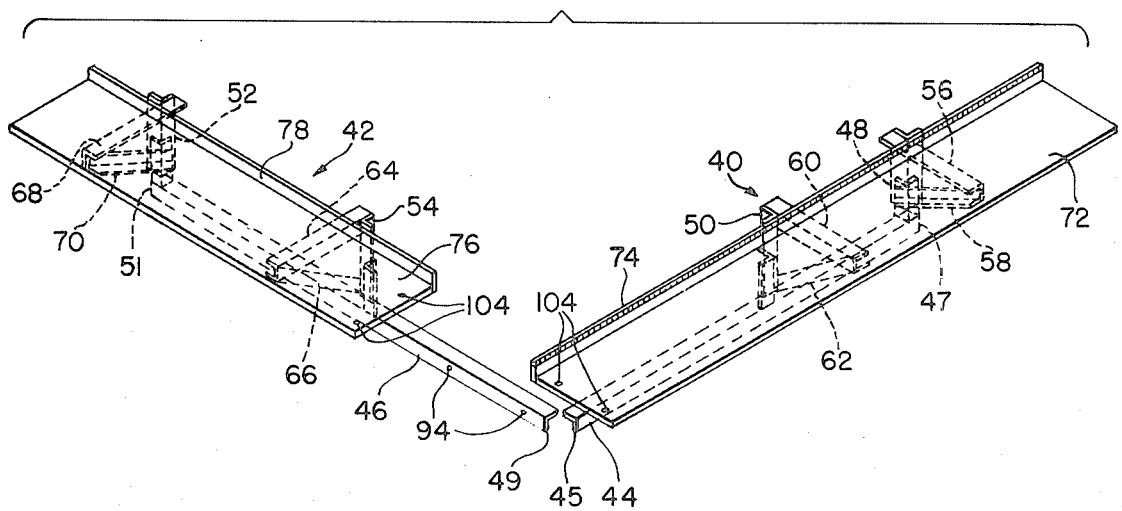
FIG. 5 is a perspective view showing right and left-hand table extensions disconnected with the truck.
Figure 6:
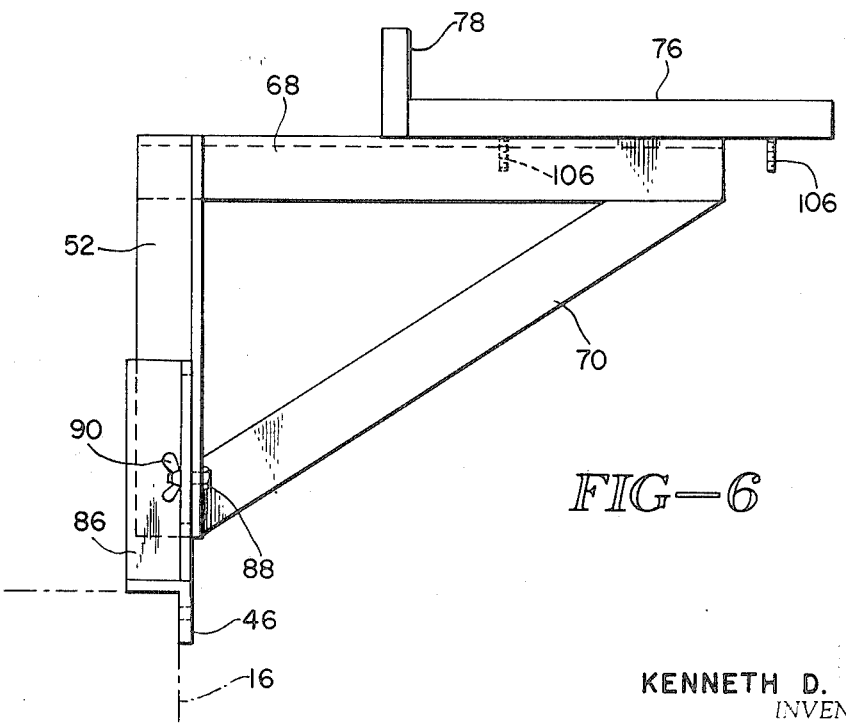
FIG. 6 is an end elevational view showing height adjustability capability of the table.

Main horizontal support frame members 44 and 46 engage bumper 16 and to this purpose they are provided with holes 94 in which are received securing bolts 96 with wing handles 98 for convenience manual turning. Connection is made at the inner end of the extension tables to the saw table by a bracket 100 secured to edge 35 of the saw table and a bracket 102 secured to the edge 38 of the saw table. The inner ends of the table extensions are provided with holes 104 which receive countersunk bolts 106, as st shown in FIG. 2. When the table is in position, wing nuts 108 are secured to the ends of bolts 106 protruding through appropriate holes in brackets 100 and 102. Thus, the table extensions are securely supported and rigidly held. The table extensions will have four points to which to be secured, two of which are on the brackets 100 and 102 and two of which are on the bumper for engaging the main horizontal frame members.

I claim:

1. A mobile and demountable saw table extension for a vehicle mounted saw structure including a saw table, said saw structure being movable between a stored and an operable position on the vehicle, comprising:
    a. a supporting frame structure detachably entirely supported on said vehicle;
    b. an elongated table surface extension supported on said frame structure;
    c. first securing means attached to said frame for detachably and rigidly connecting said frame structure to said vehicle, and
    d. second securing means attached to said frame structure for detachably and rigidly connecting said frame and table surface extension to said saw table.

2. The mobile saw table extension according to claim 1 and wherein said supporting frame structure includes at least two spaced-apart bracket members for supporting said table surface extension.

3. The mobile saw table extension according to claim 2 and wherein said frame structure includes an elongated main frame member for engaging some part of the vehicle such as the bumper and to which said first securing means are attached.

4. The mobile saw table extension according to claim 3 and wherein said frame structure includes means for adjustably setting the height of said table surface extension and bracket members with respect to said main frame member.

5. The mobile saw table extension according to claim 1 and wherein said table surface extension includes an upstanding guide rail means.

6. The mobile saw table extension of claim 1 and wherein said second securing means is attached to the underside of said table surface extension for rapid attachment to and detachment from the saw table.

7. A mobile saw and saw table extension, comprising:
    a. a vehicle-mounted radial arm saw wherein said saw is carried on the bed of a truck and is designed to be moved outwardly between guide means to a position allowing for operation thereof by a person standing at the rear of said truck, said radial arm saw including a table on the underside of which is attached connecting means for a saw table extension;
    b. a supporting frame structure;
    c. an elongated table surface extension supported on said frame structure;
    d. first securing means attached to said frame for detachably and rigidly connecting said frame structure to said vehicle, and
    e. second securing means attached to said frame structure for detachably and rigidly connecting said frame and table surface extension to said connecting means on said saw table.

8. The mobile saw and saw table extension according to claim 7 and wherein said supporting frame structure includes at least two spaced-apart bracket members for supporting said table surface extension.

9. The mobile saw and saw table extension according to claim 8 and wherein said frame structure includes an elongated main frame member for engaging some part of the vehicle such as the bumper and to which said first securing means are attached.

10. The mobile saw and saw table extension according to claim 9 and wherein said frame structure includes means for adjustably setting the height of said table surface extension and bracket members with respect to said main frame member.

11. The mobile saw and saw table extension according to claim 7 and wherein said table surface extension includes an upstanding guide rail means.

12. The mobile saw and saw table extension of claim 7 and wherein said second securing means is attached to the underside of said table surface extension for rapid attachment to and detachment from the saw table.

13. The mobile saw and saw table extension of claim 7 and wherein a saw table extension is provided on each side of said radial arm saw table.

* * * * *